3,164,829
TRACKING OF MOVING TARGETS
Schuyler Pardee, Jr., New Vernon, and Willard A. Robinson, Morris Plains, N.J., assignors to Bell Telephone Laboratories, Incorporated, New York, N.Y., a corporation of New York
Filed Apr. 5, 1962, Ser. No. 186,298
15 Claims. (Cl. 343—7.3)

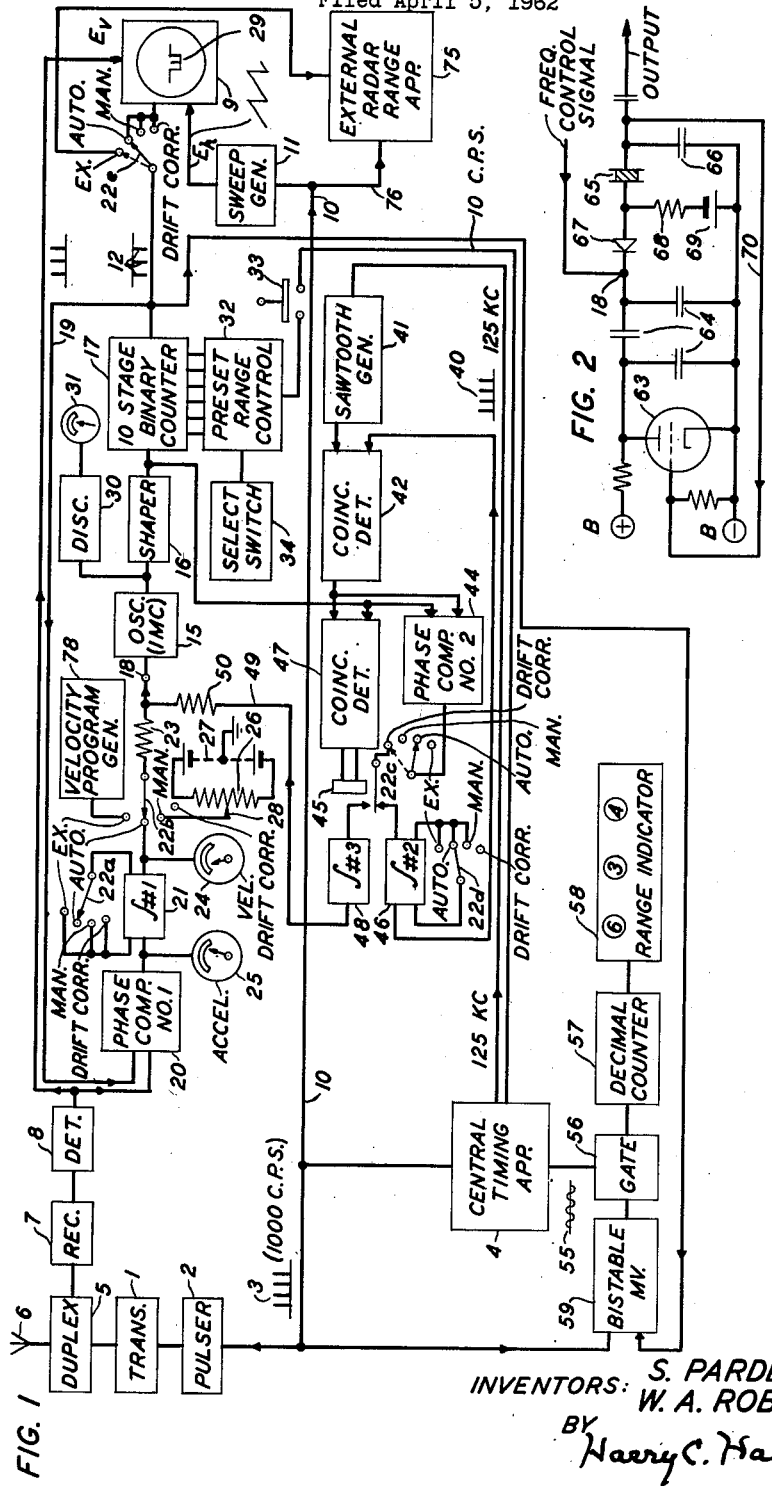

This invention deals with the location of objects, and especially moving objects or targets such as aircraft or other vehicles, by pulse echo technques: by "radar." Its principal object is to track such a vehicle, which may be traveling at a high speed, and to hold it in view as it travels long distances. Related objects are to obtain precise indications of the distance, velocity and acceleration of the vehicle being tracked, and to make a rapid substitution, for a vehicle presently being tracked, of a newly selected one.

In the location of objects by pulse radar, brief bursts of radiation, of suitable high frequency and high power, are projected in sequence from a transmitting antenna toward a target to be located, or into a region in which a target, as yet not known, may be. These bursts are caused to recur at a precisely regular preassigned rate under control of a primary pulse train. Each one travels toward the target at the speed of light and, if a target lies in its path, it is reflected and returns as an "echo" to a receiving antenna at the same speed. The time occupied by the round trip is measured. Because of the constancy of the speed of light, it is a measure of the distance of the target from the apparatus, and this distance measure has the same precsion as the time interval measurement.

When several targets, all in the path of the energy beam, are located at different distances from the apparatus, each one generates its own echo pulse and these echo pulses are recovered at various instants and can be utilized to provide indications of the locations of the several targets. Usually, however, one such target is of principal interest and the echoes from the others constitute interference and may cause confusion. This is especially true when one of the targets is moving rapidly, as in the case of an aircraft approaching a landing field. It is imperative that the control tower operator shall be able to hold such an incoming aircraft in his field of view without confusion by echoes from buildings, gas tanks and departing aircraft.

To prevent such confusion it is normal to provide the apparatus with a so-called "range gate": an arrangement which operates to select a desired target and to suppress responses to echoes from undesired ones.

As the target advances toward the control tower, i.e., as its range decreases, the time interval which elapses between a transmitted energy burst and its echo becomes shorter and shorter from burst to burst. Hence, to follow such a moving target, the range gate must be continually advanced on the time scale. Similarly, to follow a receding target, the range gate must be continually retarded on the time scale. For automatic "tracking" of such a moving target, the advance or retardation of the range gate on the time scale must be caused to take place automatically. This is commonly done by locally delaying the pulses of the primary train by a controlled amount, as by passing them through a variable delay device, comparing the instant of arrival of each echo with the instant of emergence of the corresponding locally delayed pulse from the delay device, deriving an error signal representative of the time discrepancy between these two events, and utilizing the error signal to readjust the delay device in a fashion to bring them into exact coincidence.

By virtue of the nature of the delay device the time interval that it introduces, and therefore the target range represented by this time interval, are bounded at both ends of the scale: they cannot be either indefinitely short or indefinitely long. In consequence, the only way in which it has been possible to track targets at ever greater distances is to increase the time interval between transmitted bursts to such a point that the echo of each burst returns before the transmission of the next burst. The consequent reduction of the burst rate inevitably carries with it a reduction in the accuracy with which the apparatus carries out ts assigned functions.

The invention escapes from these difficulties by measuring the alteration, with target movement, of the propagation time of a burst from the transmitter to the target and back n a different fashion. Instead of locally delaying the transmitted pulse and controlling the delay to match the propagation time, the invention provides a freerunning self-oscllator of high stability and high controllable frequency. The oscillator output wave is counted down to provide a secondary train of pulses at approximately the repetition rate of the primary train. The pulses of this secondary train, in contrast to delayed pulses of the primary train, are compared in phase with the returning echoes to derive an error signal. From this error signal there is developed, preferably by integration, a control signal which is utilized, not to readjust a delay device, but to retune the oscillator in a sense such as to reduce any phase discrepancy revealed by the comparison. Once the oscillator has settled down to its new frequency, higher than normal for an incoming target and lower than normal for an outgoing target and, in either case, an exact integral multiple of the rate at which the echoes of the successive bursts are recovered, the pulses of the secondary train are in perfect synchronism with the successive echo returns, and can serve as "range mark" pulses to control a range gate, sensitizing the apparatus during, and only during, consecutive brief intervals within each of which a single echo is recovered. Moreover, when the oscillator is operating in this fashion, the control signal which acts to pull it away from its nominal frequency is representative of the target velocity and can be utilized to actuate a velocity meter. If, as is preferred, the frequency control signal is developed from the phase error signal by integration, the phase error signal is representative of the target acceleration, and can be utilized to actuate an acceleration meter.

The secondary pulse train that is developed in this fashion is characterized by a high degree of regularity and freedom from sporadic variations of phase or "jitter." These characteristics are due, in part, to two principal causes. First, it is the frequency of the oscillator, representing target velocity, that is directly controlled, whereupon the consequent phase displacement of the secondary pulse train, representing changes in target range, gradually accumulates by itself; and the improvement stems from the fact that the integration from frequency to phase that is carried out by the oscillator has a smoothing effect, which would hold even if the oscillation frequency were to be abruptly altered. Second, employment of an oscillator of high frequency stability prevents instantaneous alterations of its frequency while permitting such alterations to take place at the comparatively slow speeds that represent the comparatively slow velocity changes encountered in practice, even with high speed aircraft.

The change of target range from any initial value to its present value is represented on the display apparatus by a movement of a visible counterpart of the range gate along the range scale. This movement stems from the accumulation of phase discrepancy between the secondary pulse train derived from the counter and the primary pulse train, i.e., the train of transmitted bursts. Because this phase discrepancy can be accumulated without limit, the range mark pulses of the secondary train can be caused to track a target at a much greater distance than has heretofore been possible: at a distance well beyond the upper limit of the range scale. Thus the apparatus can follow an outgoing target to a great distance and can pick up an incoming target at an equally great distance, the tracking limits being dependent solely on the energy of the outgoing bursts and the sensitivity of the receiving apparatus, in contrast to the dependence on the limitations of the timing apparatus that characterizes systems of known construction.

As a consequence of the employment of an oscillator whose frequency deviations are proportional to target velocity so that target range, represented by the accumulation of phase shifts of the secondary pulse train, is unbounded, removal of the control signal from the tuning terminal of the oscillator permits the oscillator output wave to drift. In accordance with a further feature of the invention, when a selected target is released, such drift is arrested by development of a drift correction signal which acts to synchronize the oscillator with the primary pulse train and so to hold the pulses of the secondary train in an exact phase relationship with those of the primary pulse train and thus to hold the range gate at a fixed point on the range scale. The point of the range scale at which it is thus fixed may be manually controlled by application of an auxiliary control signal to the tuning terminal of the oscillator. Upon removal of this simulated control signal, the drift prevention apparatus comes into play and takes control. Moreover, when automatic tracking operation is resumed, the drift correction signal is not at once removed. Rather, provision is made to hold it at its most up-to-date magnitude and to continue its application, along with the tracking control signal, to the oscillator. This relieves the tracking control signal of performing any drift correction function in the course of tracking, and so assists it, and the oscillator frequency departures which it controls, to continue to be exclusively representative of target velocity.

As an alternative to the manual setting of initial range, the initial position on the range scale at which the range gate appears may be preset by predisposing the states of the several stages of the counter-divider to a condition that represents the complement of the desired preset range. This can be done substantially instantaneously and without departing from operation in the automatic tracking manner.

The invention will be fully apprehended from the following description of an illustrative embodiment taken in connection with the accompanying drawings in which:

FIG. 1 is a schematic block diagram showing apparatus embodying the invention; and FIG. 2 is a schematic circuit diagram showing a high-stability tunable oscillator suitable for inclusion in the block diagram of FIG. 1.

Referring now to the drawings, FIG. 1 shows a transmitter 1 of high power and high frequency that is successively and briefly energized by a pulser 2 controlled by the pulses of a primary train 3 that recur with full regularity at a repetition rate of, for example, 1,000 pulses per second derived from central timing apparatus 4 which may be of well known construction. This apparatus may include a high-stability source of oscillations of high frequency, for example, 100 megacycles per second, and may include frequency dividers of well known variety to derive various integral subharmonics of this frequency as required for various purposes. The primary train of 1,000 pulses per second may be one of these subharmonics.

The consecutive bursts of high frequency energy developed by the transmitter 1 and controlled by the pulser 2 are passed through a duplexer 5 of well known variety to an antenna 6 by which they are projected toward a target, known or unknown.

Advantageously, the antenna 6 has a high directional characteristic and may, furthermore, be rotatable about two orthogonal axes, thus to project its beam toward any point in space.

Upon striking a target, moving or stationary, each burst is reflected as an echo and is recovered by the antenna 6 whereupon it is passed by the duplexer 5 to receiver apparatus 7 which amplifies it to a suitable level. The envelope of each reflected burst is then recovered as a pulse by a detector 8, and the train of echo pulses thus developed is applied to display apparatus, e.g., to the vertical deflection elements of a cathode beam oscilloscope 9. The pulses of the primary train 3 are applied by way of a conductor 10 to a sweep generator 11 which delivers a sawtooth wave of the same frequency. This is applied to control the horizontal deflection of the cathode beam in the oscilloscope 9. A train 12 of range mark pulses, developed in a fashion to be described, is also applied to the oscilloscope 9. It may control the vertical deflection of the oscilloscope, as indicated, or, if preferred, it may control the strength of the cathode beam.

An important element of the system is a high-stability oscillator 15 proportioned to deliver oscillations at a frequency approximately equal to an integral multiple of the repetition rate of the primary pulse train 3. It is here indicated as having a nominal frequency of one megacycle or 1,000 kilocycles per second, i.e., one thousand times the pulse repetition rate of the primary train 3. Each cycle of the output wave of this oscillator 15 is sharpened by a shaper 16 and the frequency of the resulting intermediate train is divided or "counted down" by a fixed factor, in this case one thousand, by a counter 17 to deliver a secondary pulse train 12 of which the frequency is approximately equal to that of the primary pulse train 3. A conventional ten-stage binary counter which by itself counts to 1,024 can readily be altered, by interstage couplings, to count to a lower number, e.g., 1,000, and so to serve as a divider by the same factor.

The oscillator 15, while of high stability, is of a turnable variety and is provided with a tuning control terminal 18. Because, for the purposes of the invention, the frequency change required is very small, for example, of the order of a few parts per million, there is no incompatibility between the requirement of high stability and the requirement of turnability. The frequency stability of an oscillator of which the principal frequency determining element is a piezoelectric crystal is known to be high, though its frequency is, at the same time, subject to a small but sufficient amount of "pulling" by a control signal applied to a suitable signal-responsive reactance trimmer element.

The secondary pulse train 12 developed at the output point of the counter-divider 17 is applied, over a feedback path 19 to one input point of a phase comparator 20, to the other input point of which the train of echo pulses derived from the detector 8 is applied. The phase comparator 20, which may take any of a variety of forms, delivers at its output point signal of one polarity when an echo pulse reaches it earlier than one of the marker pulses 12, of opposite polarity when the echo pulse reaches it later than the marker pulse, and of zero magnitude when these events occur simultaneously. The comparator output is thus a phase error signal. Advantageously, this phase error signal is applied to an integrator 21, and the phase error integral thus developed is applied through a four-position switch 22b, when thrown to the position shown for automatic operation, and through a buffer resistor 23 as a control signal to the tuning control terminal 18 of the oscillator 15. (The several positions of the switch 22b may be designated, in order, "Exercise," "Automatic," "Manual," and "Drift Correction." Description of the operations of the apparatus when the switch is thrown to its other positions will be deferred.) This control signal is positive, negative, or zero in dependence on the accumulation, since the instant at which the apparatus was put in operation, of the phase error signals developed by the comparator 20, and it operates to pull the frequency of the oscillator 15 away from its nominal value to whatever frequency best serves to hold the magnitude of the phase error signal to zero; i.e., to a frequency of which the one thousandth submultiple, the repetition rate of the secondary pulse train 12, is in exact synchronism, in frequency and in phase, with the train of recovered echoes. The counter 17 divides the pulled oscillator frequency by the same factor 1,000 and so develops a secondary pulse train 12 of exactly the echo return frequency and hence of exactly the frequency to serve as a sequence of range mark pulses for following and tracking a target that is advancing or receding at a constant velocity. Selective tracking of this target, i.e., exclusion of all other targets from the tracking process, is accomplished by application of the range mark pulses of the secondary train 12 to the phase comparator 20 for utilization as range gates in the conventional manner.

As indicated above, the inclusion of the integrator 21 between the comparator 20 and the tuning control terminal 18 of the oscillator 15, though advantageous, is not essential for automatic tracking of a target. By virtue of the feedback conductor 19, the oscillator 15 is included in a "phase control loop" and hence, even without the integrator 21, automatic readjustment of its frequency takes place continuously in a sense to reduce the magnitude of the phase error output of the comparator 20.

The advantage obtained by inclusion of the integrator 21 in the frequency control path is as follows. The phase of the output of the oscillator 15 is the integral of its frequency. If, as is desirable for tracking a target with a minimum of error, the accumulated phase shift of the oscillator output is to be accurately representative of target distance, its frequency, and therefore the control signal applied to its frequency control terminal, must be similarly representative of target velocity. Inasmuch as each increment of phase error signal at the output point of the comparator 20 represents a corresponding increment of target acceleration, the integrator 21 is advantageously included to convert the acceleration signal to a velocity signal.

It is convenient to secure the required alterations of the frequency of the oscillator 15 by controlled alterations of one of its frequency-determining elements; e.g., a trimmer capacitance forming a part of its "tank" circuit. Over the small ranges required, i.e., a few parts per million, the frequency change is accurately proportional to the change in the frequency-determining element. If this, in turn, is proportional to the magnitude of the control signal which causes the change, then the control signal is proportional to velocity. But even if the relation between control signal change and consequent change in the frequency-determining element is a nonlinear oe, the control signal is nevertheless representative of target velocity. It can therefore be utilized to acutate a velocity meter 24. Lack of exact proportionality between the actuating control signal and the actuated frequency-determining element can be compensated, either by providing the meter 24 with a nonuniform velocity scale, or by use of a nonlinearity compensator.

Because the momentary departure of the frequency of the output of the oscillator 15 from its nominal magnitude is proportional to the momentary velocity of approach or recession of the target being tracked, the output of the oscillator 15 may, if preferred, be applied to a frequency discriminator 30 of conventional construction, which operates to translate each such frequency departure into a steady voltage that is proportional to it. This voltage may be applied to a suitably calibrated meter 31 whose readings are then directly indicative, on a uniform scale, of the velocity of the target being tracked.

Because of the high stability of the oscillator 15, it offers a transitory resistance to being "pulled" from the frequency at which it is currently operating to any other frequency, as by a change in the magnitude of the control signal. Hence, when a target accelerates or decelerates, as in the case of an aircraft taking off from its landing field or approaching it with "flaps" down, the phase error signal derived by the comparator 20 is representative of the acceleration of the target and can be applied to an acceleration meter 25, which then indicates the acceleration or deceleration.

When it is desired to switch from a target presently being tracked to another target as, for example, when an aircraft has landed safely at its field and the control tower operator is free to direct his attention to the next incoming aircraft, he may throw the switches 22a and 22b to the "manual" position. Along with other switches to be described, the switches 22a and 22b may advantageously be ganged together. The switch 22a discharges the integrator 21 and the switch 22b removes from the control terminal 18 of the oscillator 15 the control signal developed by the integrator 21 and applies to it, instead, a steady voltage derived from a potentiometer 26 connected to a battery 27 of which the midpoint is grounded, and of a magnitude determined by the adjustment of the movable tap 28. This voltage serves as a simulated velocity control signal and causes the oscillator frequency to shift, upward or downward, and the corresponding frequency of its downcounted counterpart, the secondary train 12, correspondingly to shift upward or downward with respect to the frequency of the primary train 3. This, in turn, causes the visual counterpart 29 of the range gate to travel on the face of the oscilloscope 9 in one direction or the other in dependence on whether the simulated control signal is positive or negative, thus to locate it at any point of the range scale to suit the operator's preference. Indeed, because the control signal exercises its direct control on frequency, in contrast to the phase of the secondary pulse train 12, which thereupon accumulates without restriction from the apparatus, the range gate 29 can be driven, in this fashion, far off the normal range scale, as represented by the length of the horizontal sweep of the oscilloscope beam, so as to pick up an incoming target at a great distance and long before it reaches a region in which traffic density is dangerously high. Once such a target has been seized, it is tracked, its visible counterpart appearing on the screen of the oscilloscope as a "second sweep echo" or a "third sweep echo," etc., i.e., the echo of a designated energy burst which returns to the receiver apparatus only after the transmission of the next ensuing energy burst or bursts. Means and methods are well known to radar operators by which a second sweep echo or a third sweep echo can be recognized as such. Once the target has approached to the range at which the echo of any burst arrives before the transmission of the following burst, its visible counterpart appears as a "first sweep echo" and normal interpretation of the trace on the oscilloscope screen can be resumed. The ambiguity, if any, applies only to the visible representation. Positive tracking is continuous throughout the approach of the target from the farthest range at which it can be seized to the shortest range of interest or throughout the recession of a target through the same distance.

If preferred, each time the control operator has released one target to direct his attention to another, instead of manually shifting the range gate over the range scale by manipulation of the movable tap 28 on the potentiometer 26, he may cause it at once to appear at a preassigned range—for example, at a range which has for administrative purposes been defined as the outer limit of the danger area surrounding the airport. To effect this immediate location of the range gate at a preassigned range, the counter 17 may be preset to a preassigned permutation of the stability states of its constituent stages. To this end the counter 17 may be provided with a preset range control unit 32 that may be actuated by a pulse of an auxiliary train derived from the central timing apparatus 4 of a suitable low recurrence rate, for example, 10 cycles per second. Upon application of this control pulse to the preset range control apparatus by depressing a push button switch 33, it forcibly drives the individual constituent stages of the counter into preassigned stable states. The permutation thus preset may be controlled by a selector switch 34. For example, if the constituent stages of the counter are preset to stable states representing the number 530, it proceeds to count the cycles of the oscillator output from that condition, thus counting the sequence 531, 532, 533, etc., and delivering its first output pulse after 470 such counts; this number being the complement of 530, whereupon it returns to zero, counts to 1000, delivers a second output pulse, and so on. Thus, its consecutive output pulses are delivered on the counts 470, 1470, 2470, 3470, . . . and so on, of which the first count, 470, is the complement of the preset condition and represents the distance, for the initial energy burst, to which the range gate has been preset, while the later counts—1470, 2470, etc.—represent a range gate set for the same distance but for subsequent transmitted energy bursts.

By choice of the nominal frequency of the oscillator 15 the full capacity of the counter 17 can be caused to represent any desired distance in convenient round numbers. Thus, for example, by choosing for the oscillator a nominal frequency of 923 kilocycles per second, each cycle of its output corresponds to a one-tenth mile increment of target distance. Presetting the counter to a cycle count of 530 thus corresponds to a preset range of 47 miles.

If preferred, the range scale may be coordinated with the time scale in terms of feet or yards as units of distance. Thus, by choice of 938 kilocycles per second for the nominal oscillator frequency, each full cycle of its output wave corresponds to a range increment of 500 feet.

In either case refinements may be employed by which the smallest recognizable distance increment is substantially less than one-tenth mile or 500 feet; e.g., 1/100 mile in the former case or 50 feet in the latter case.

It may on occasion happen that, when the operator has released one target by throwing his switch 22 from "automatic" to "manual," and has searched for another target by movement of the movable tap 28 of the potentiometer 26, he can find none. In such event, since the oscillator is no longer locked in synchronism with any reference pulse train, its frequency may drift. If permitted to continue, this frequency drift would cause a drift of the range gate in the range coordinate and of its visible counterpart 29 on the face of the oscilloscope 9.

This drift is arrested, in accordance with the invention, in the following way. An auxiliary pulse train 40 of a frequency integrally related to the oscillator frequency, for example, of 125 kilocycles per second, which is exactly one-eighth of the illustrative oscillator frequency of 1000 kilocycles per second, is derived from the central timing apparatus 4; and auxiliary apparatus is provided to shift the phase of this auxiliary pulse train through an appropriate electrical angle. This phase shift may be accomplished by developing from the auxiliary pulse train 40 and through the agency of a generator 41 a sawtooth wave of the same frequency and by applying this sawtooth wave to one input point of a coincidence detector 42 while simultaneously applying a second auxiliary voltage to its other input point. The coincidence detector 42 delivers a pulse each time the magnitude of the sawtooth wave voltage of the generator 41 coincides with the magnitude of the second auxiliary voltage. The resulting train of pulses is of frequency 125 kilocycles per second but of phase dependent on the magnitude of the second auxiliary voltage. It is applied, along with the 1000 kilocycle pulse train output of the shaper 16, to a second phase comparator 44 which delivers at its output point a control signal representative of the phase discrepancy between the output wave of the oscillator 15 and the auxiliary (125 kilocycles per second) pulse train 40 as shifted in phase by the units 41 and 42.

When the operator has thrown his switch 22 to the "drift correction" position, the output of this second phase comparator 44 is applied through the section 22c of this switch and through a relay 45, of which the tongue makes connection with the back contact, through an integrator 46 to the second input point of the coincidence detector 42, thus to shift the level of the second auxiliary voltage and so to shift the phase of the auxiliary train 40, in a sense to modify its phase angle to such a point that each of its pulses coincides in time with one out of each group of eight pulses derived from the shaper 16; i.e., to such a point that the phase-shifted auxiliary pulse train is in phase with the output wave of the oscillator 15. When this happens, a second coincidence detector 47, recognizing that these two events coincide in time, delivers an output pulse which pulls the tongue of the relay 45 to its front contact, whereupon the output of the phase comparator 44 is delivered through another integrator 48 over a drift correction path 49 and through a buffer resistor 50 to the frequency control terminal 18 of the oscillator 15. When, now, any drift of the oscillator frequency commences to take place, a phase error signal is developed by the phase comparator 44 and is delivered, after modification by the integrator 48, as an auxliary control signal to retune the oscillator 15 in a sense to offset the incipient drift.

When the switch 22 is again thrown to the automatic tracking position, bank 22d of this switch discharges the auxiliary integrator 46, thus to restore the auxiliary 125 kilocycle pulse train 40 to its original phase condition and so to place the drift correction apparatus in readiness to accept a new demand for its services.

In contrast, and provided its decay time is sufficiently long, the integrator 48 holds its correction voltage even after the switch 22 has been thrown to the automatic tracking position, thus removing the input from the integrator 48. In consequence, the output of the integrator 48 continues to be applied over the conductor 49 to the frequency control terminal of the oscillator 15 during the progress of tracking. Thus, in the tracking condition the oscillator receives two component control signals, one from the phase comparator 20 and the other from the integrator 48. Continued application of this latter component control signal relieves the tracking control signal of responsibility for making any corrections in the frequency of the output of the oscillator 15 that may have been due to drift, either of the nominal frequency of the oscillator 15 or of the nominal pulse rate of the central timing apparatus 4. The former component of the control signal, derived from the phase comparator 20, is thus representative exclusively of the velocity of the target being tracked, unhampered by frequency drift.

An integrator of quality more than adequate for the purpose is one of the so-called "Miller integrator" configuration; i.e., an operational amplifier having a capacitive feedback path extending from its output point to its input point. Such an integrator is described, for example, in "Pulse and Digital Circuits" by J. Millman and H. Taub (McGraw-Hill, 1956) pages 25 and 214. An integrator of this configuration can readily be constructed having a decay time of many hours.

The momentary magnitude of target range may conveniently be determined simply by counting the cycles of a suitable high frequency timing wave between the instant at which a burst of energy is projected toward the target and the instant at which its echo is returned. To this end an output wave 55 of a high frequency, for example, 100 megacycles per second, is derived from the central timing apparatus 4 and applied through a gate 56 to a decimal counter 57 of which the output actuates a range indicator 58. The gate 56 is opened and closed, as required, by the output of a bistable multivibrator 59 which is driven into its first stable condition by each pulse of the primary train 3, thus to open the gate 56, and driven into its second stable condition, thus to close the gate 56, by the corresponding pulse of the secondary train 12 which, as explained above, coincides in time exactly with the echo return.

FIG. 2 shows the circuit details of an oscillator that has been found to serve the purposes of the invention, easily meeting the requirements of stability and tunability. It comprises a vacuum tube 63 of the grounded cathode configuration of which the anode is returned to the cathode through a reactive network comprising a group of impedance-matching capacitors 64, a piezoelectric crystal element 65, a terminating capacitor 66, a solid state diode 67, a resistor 68 and a bias source 69. The crystal element is proportioned to be resonant in its series-tuned mode, in which case its behavior in the network is equivalent to that of a coil connected in series with a condenser. The diode 67 biased by the source 69, is equivalent to a resistance of negligible magnitude connected in series with a voltage-dependent capacitance. The alternating component of the voltage appearing across this reactive network is applied, by way of a feedback path 70 to the grid of the amplifier tube 63. The junction of the terminating condenser 66 with the feedback path 70 may constitute the output terminal of the oscillator. As is well known, the capacitance presented by the diode 67 depends, although not in a completely linear fashion, on the voltage applied to it; and this may be derived, either from the potentiometer 26 for manual operation, from the integrator 21 for automatic operation, or from the drift correction path 49 for drift correction.

As compared with a train of range marker pulses developed in other ways, the range mark pulse train 12, developed as described above, is of improved reliability, regularity and freedom from sporadic variations of phase or "jitter." This makes for improved accuracy of tracking and target velocity measurements. The same advantageous properties make it suitable for other purposes, as well. Thus, if the pulse train be transmitted, through the switch 22e in its "Exercise" position, to an external Radar Range apparatus 75, timed to operate in synchronism with the present apparatus, as by an extension 76 of the timing conductor 10, it will appear to such other apparatus as a train of "virtual" echoes: echoes, from an imaginary moving target, of energy bursts which are not, in fact, transmitted. Operating personnel of the system 75 can thus practice their skills and exercise their apparatus. When employed in this fashion, the phase shifts of the range marker pulse train 12 can be caused to simulate any preassigned maneuvers of the virtual target, conventional or radical. To this end the switch 22b, when thrown to the "Exercise" position, removes from the oscillator 15 the control signal derived from the comparator 20 and supplies it, instead, with an artificial test signal, representative of the desired velocity and velocity variations of the virtual target, derived from a conventional program generator 78. Advantageously the latest drift correction signal continues to be applied, over the path 49, to the tuning control terminal 18 of the oscillator 15, along with the velocity program signal.

While the invention has been described, in automatic operation, as engaged in the tracking of aircraft approaching a landing field and in the interests of avoiding traffic accidents, it is obviously of application to the tracking of other moving vehicles, objects, or bodies—e.g., automobiles traveling on major highways, enemy airplanes approaching a military establishment, incoming or outgoing ballistic missiles, artificial satellites, and the like.

What is claimed is:

1. In a pulse echo ranging system, means for generating a primary train of pulses that recur at a preassigned fixed rate R,
   means controlled by said pulses for projecting consecutive bursts of energy toward a target,
   means for recovering energy burst echoes reflected from said target,
   a high-stability self-oscillator proportioned to deliver a wave of frequency approximately $nR$ where $n$ is an integer,
   said oscillator having a controllably variable frequency-determining element,
   a divider, of fixed division factor $n$, for developing from said wave a secondary train of range mark pulses of repetition rate approximately R,
   said divider comprising a binary counter having a plurality of intercoupled stages, each having two different stable states,
   a first comparator for comparing the phase of said secondary pulse train with that of the sequence of burst echoes to derive a first phase error signal,
   a first control path extending from said first comparator to the variable frequency-determining element of said oscillator,
   said path including means for applying said phase error signal by way of said path to said element to alter the frequency of said oscillator in a sense to reduce the magnitude of said phase error signal,
   whereby said secondary pulse train remains in synchronism with recovered burst echoes reflected from a selected target having a relative velocity toward or away from said echo recovering means.

2. In combination with apparatus as defined in claim 1, an integrator included in tandem in said first control path.

3. In combination with apparatus as defined in claim 2, an acceleration indicator having a deflectible element, and means for energizing said indicator by said phase error signal.

4. In combination with apparatus as defined in claim 1, a velocity indicator having a deflectible element, and means for energizing said velocity indicator by said first control signal.

5. In combination with apparatus as defined in claim 1, a discriminator, having an input terminal and an output terminal, for translating the frequency of a wave applied its input terminal into a voltage appearing at its output terminal, said input terminal being connected to the output terminal of said oscillator, and a velocity indicator connected to the output terminal of said discriminator.

6. In combination with apparatus as defined in claim 1, means for disabling said first control path, a manually adjustable source of voltage, and means for applying the voltage of said source, instead of said phase error signal, to said frequency-determining element.

7. In combination with apparatus as defined in claim 1, means for controllably causing the several stages of said counter to adopt preassigned states which together specify a count representative of a preassigned range.

8. In a pulse echo ranging system, means for generating a primary train of pulses that recur at a preassigned fixed rate R,
   means controlled by said pulses for projecting consecutive bursts of energy toward a target,
   means for recovering energy burst echoes reflected from said target,
   a tunable, high-stability, free-running oscillator proportioned to deliver a wave of frequency approximately $nR$ cycles per second, where $n$ is an integer greater than unity,
   said oscillator having a controllably variable frequency-determining element,
   a divider proportioned to develop from said wave a secondary train of range mark pulses, one from each group of $n$-consecutive cycles of said wave, the repetition rate of said range mark pulse train being thus approximately R,
   a first comparator for comparing the phase of said secondary pulse train with that of the sequence of burst echoes to derive a phase error signal that is of one magnitude for an approaching target and of a different magnitude for a retreating target, a first control path extending from said comparator to the variable frequency-determining element of said oscillator, said path including means for applying said phase error signal by way of said path to said elment to alter the frequency of said oscillator in a sense to reduce the magnitude of said phase error signal, whereby said range mark pulse train remains in synchronism with recovered burst echoes reflected from a selected target having a relative velocity toward or away from said echo recovering means.

9. In combination with apparatus as defined in claim 8, means occasionally operative in the absence of recovered echoes for monitoring the frequency of said oscillator to determine any drift of its frequency from an integral multiple of the frequency of said primary pulse train and for developing an auxiliary drift correction signal representative of said drift, and means operative in the presence of recovered echoes for supplying said auxiliary drift correction signal with its most recent magnitude to the frequency-determining element of said oscillator along with said phase error signal, whereby said first control signal is exclusively representative of target movements, undiluted by corrections for frequency drift of said oscillator.

10. In combination with apparatus as defined in claim 8, means for arresting incipient frequency drift of said oscillator which comprises means for developing a tertiary pulse train integrally related to said primary pulse train, means for phase-shifting said tertiary pulse train in the direction of phase-coincidence with said secondary pulse trains, means for developing a control signal that is representative of a phase discrepancy between said phase-shifted tertiary pulse train and said secondary pulse train, and means for applying said control signal to tune said oscillator to an integral multiple of the frequency of said primary pulse train.

11. In combination with apparatus as defined in claim 8, means for correcting incipient phase drift of said oscillator which comprises means for developing an auxiliary train of pulses that recur at a rate which is an exact integral multiple of the rate R, means for controllably shifting the phase of said auxiliary pulse train to provide a tertiary pulse train, a second comparator for phase-comparing said tertiary pulse train with said secondary pulse train to develop an auxiliary phase error signal, a second control path extending from said second comparator to said phase-shifting means for applying said auxiliary phase error signal to said phase-shifting means in a sense to reduce said auxiliary phase error signal, a third normally disabled control path extending from said second comparator to the frequency-determining element of said oscillator, and means, operative in response to approximate phase-coincidence between said secondary pulse train and said tertiary pulse train for enabling said third control path, thereby to apply said auxiliary phase error signal to the frequency-determining element of said oscillator in a sense to reduce said auxiliary phase error signal and thus to hold the oscillations of said oscillator in synchronism with said auxiliary pulse train.

12. In combination with apparatus as defined in claim 11, an integrator included in said second control path.

13. In combination with apparatus as defined in claim 11, an integrator included in said third control path.

14. In a recurrent pulse object location system including a transmitter of energy bursts, means for generating a primary pulse train of fixed repetition rate for controlling said transmitter, a receiver, a free-running tunable range gate generator for developing a secondary range mark pulse train for controlling said receiver, and means, operative when a moving vehicle is being tracked, for tuning said gate generator to the frequency of recovery of echoes of consecutive bursts, the frequency of said gate generator being subject to drift in the absence of a tracked target, means for arresting said drift which comprises means for developing a tertiary pulse train integrally related to said primary pulse train, means for phase-shifting said tertiary pulse train in the the direction of phase-coincidence with said secondary pulse train, means for developing a control signal that is representative of a phase discrepancy between said phase-shifted tertiary pulse train and said secondary pulse train, and means for applying said control signal to tune said gate generator to the frequency of said primary pulse train.

15. In combination with apparatus as defined in claim 8, a program generator for developing a program control signal that varies in time in related conformance with variations in the velocity of an imaginary target, means for disabling said first control path, means for applying said program control signal, instead of said phase error signal, to the frequency-determining element of said oscillator to develop a secondary pulse train representative of echoes from said imaginary target, external radar tracking apparatus, means for operating said external apparatus in synchronism with said primary pulse train, and means for transmitting the secondary pulse train thus developed to said external apparatus for use in the simulation of a target to be tracked.

References Cited in the file of this patent
UNITED STATES PATENTS

| | | |
|---|---|---|
| 2,516,356 | Tull | July 25, 1950 |
| 2,538,027 | Mozley | Jan. 16, 1951 |
| 3,040,311 | Segerstrom | June 19, 1962 |